No. 792,906. PATENTED JUNE 20, 1905.
R. KLIEN & R. LINDNER.
LOCOMOTIVE.
APPLICATION FILED MAY 31, 1904.
2 SHEETS—SHEET 1.
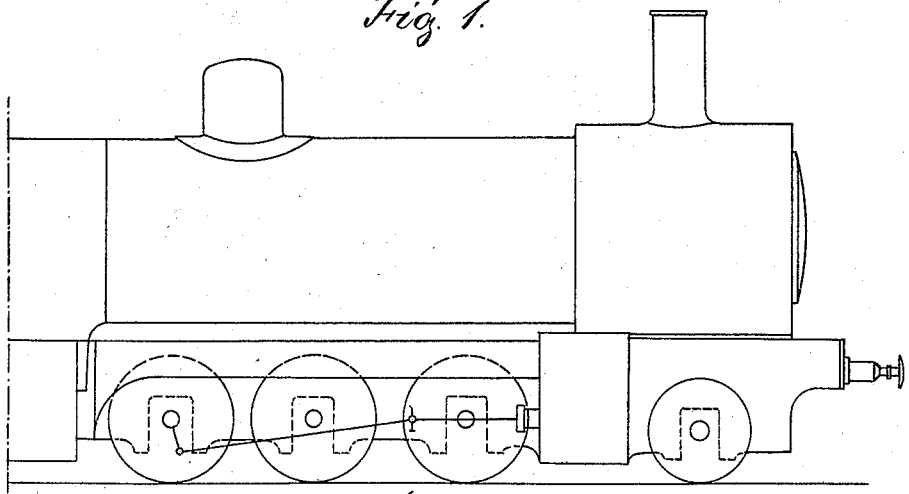
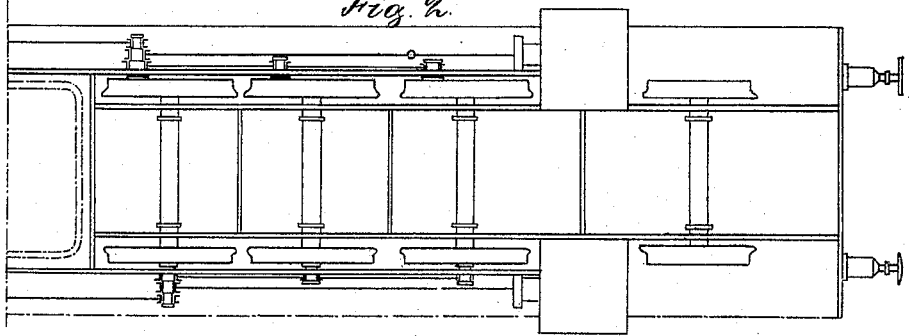
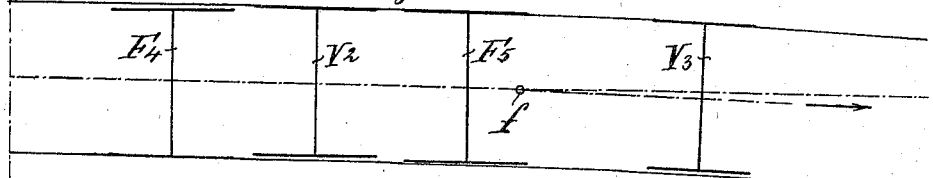
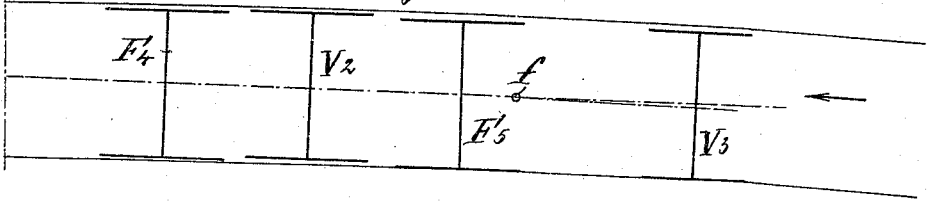
Witnesses.
Emil Kayser
Paul Wollenberg
Inventors:
Richard Klien
Robert Lindner
by
Attorney.

No. 792,906. PATENTED JUNE 20, 1905.
R. KLIEN & R. LINDNER.
LOCOMOTIVE.
APPLICATION FILED MAY 31, 1904.
2 SHEETS—SHEET 2.
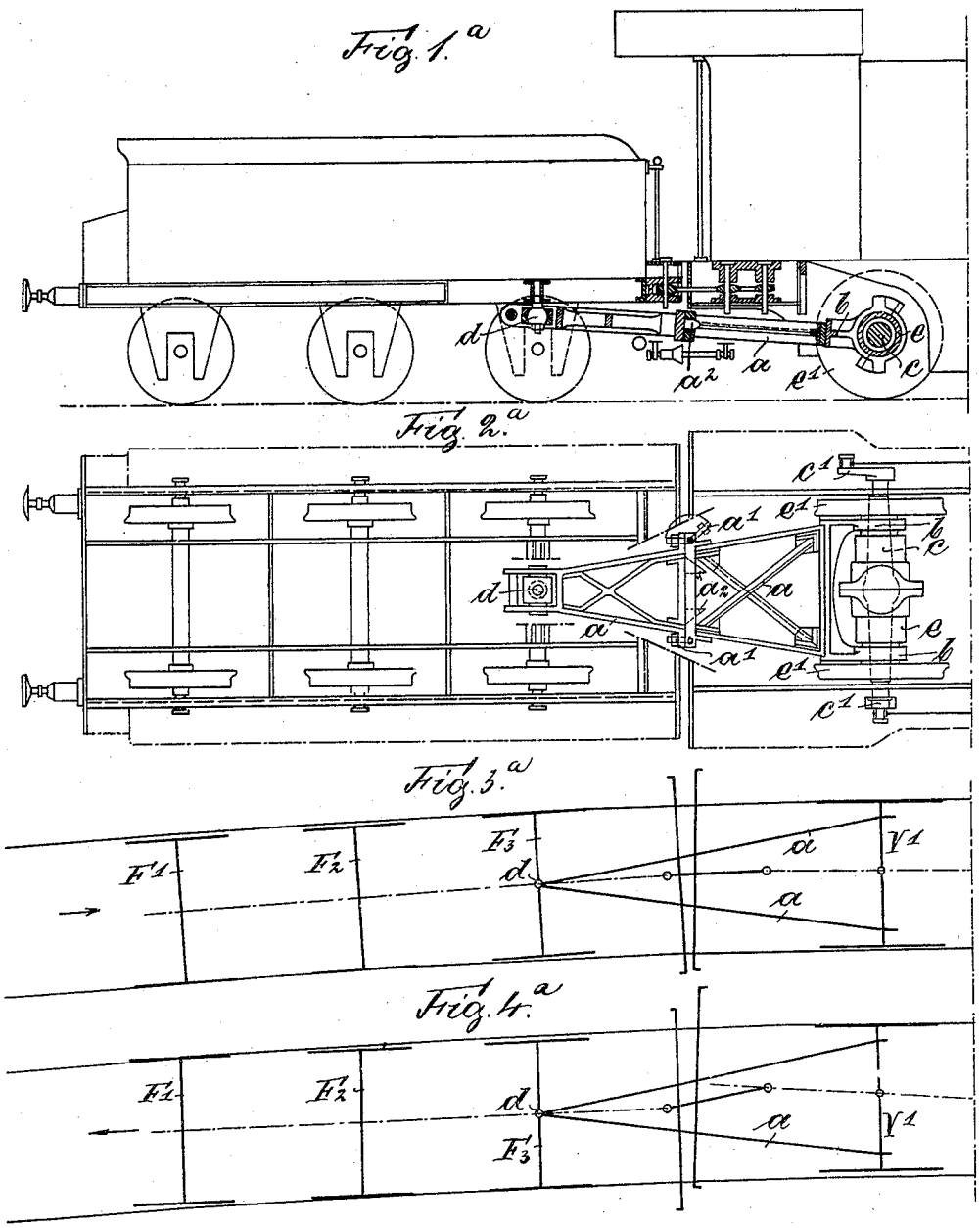

No. 792,906. Patented June 20, 1905.

UNITED STATES PATENT OFFICE.

RICHARD KLIEN AND ROBERT LINDNER, OF DRESDEN, GERMANY.

LOCOMOTIVE.

SPECIFICATION forming part of Letters Patent No. 792,906, dated June 20, 1905.

Application filed May 31, 1904. Serial No. 210,530.

*To all whom it may concern:*

Be it known that we, RICHARD KLIEN, residing at 41 Comeniusstrasse, and ROBERT LINDNER, residing at 36 Walterstrasse, Dresden, in the Kingdom of Saxony, German Empire, subjects of the King of Saxony, have jointly invented certain new and useful Improvements in Locomotives, of which the following is an exact specification.

Our invention relates to improvements in railroad-locomotives, and more especially to a construction of the locomotive-trucks.

The purpose of the invention is to provide means for swiveling the locking-axle in the curves by connecting this axle to the tender of the locomotive.

In order to make our invention more clear, we refer to the accompanying drawings, in which—

Figures 1 and $1^a$ represent a diagrammatic side view of a locomotive provided with our new invention, the parts forming the invention being partly shown in section. Figs. 2 and $2^a$ represent a diagrammatic view of the locomotive seen from below. Figs. 3 and $3^a$ and 4 and $4^a$ are diagrams showing the position of the parts forming the object of our invention during the passage of curves.

In the drawings, $c$ is a crank-shaft of the locomotive, which shaft is provided with cranks $c'$ $c'$ on both ends. Around this axle $c$ a hollow axle $e$ is placed, to which the wheels $e'$ $e'$ are fixed. The hollow axle $e$ is connected to the axle $c$ in such a way that it can swing a little bit around this axle and can be moved a little distance in the longitudinal direction. This has for its purpose to allow a swiveling of the hollow axle, to which the wheels are fixed, and a simultaneous sideward movement during the passage of the locomotive through curves. Such constructions of swiveling axles which have hitherto been devised have the disadvantage that the swiveling is not effected by force and that in consequence hereof the hollow axle is not brought by force into the radial position or into the so-called "overradial" position, which is sometimes advisable. The overradial position means the position of the axle in which this axle is placed when on entering a curve it has been turned so far as to overpass the radial position and to stand in a position which would be adapted to a curve of smaller radius. In order to do away with this disadvantage, we connect the hollow axle $e$, by means of a frame $a$, to the tender or other carriage coupled to the locomotive.

In the construction shown in the drawings the frame $a$ consists of two parts, one of which is fixed to the locomotive, whereas the other one is fixed to the tender. Both parts can be connected to each other by means of screws $a'$ $a'$. For adjusting the two parts in their position and effecting an easy coupling of the same bevel-faces $a^2$ may be provided, which cause the two parts always to adopt the right position in case the tender is shifted against the locomotive. The frame is fixed to the hollow axle $e$ by means of the arms $b$ $b$, situated around the hollow axle, and is fixed to the tender by means of a ball-gudgeon $d$. This ball-gudgeon is constructed so as to allow a swinging of the frame and a small movement of the same in the longitudinal as well as in the front direction. The effect of this construction shall be described with reference to the diagrams shown in Figs. 3 and $3^a$ and 4 and $4^a$. In the example shown the locomotive has five axles and the tender has three axles. The axles $F'$ $F^2$ $F^3$ of the tender are rigidly journaled. The axles $F^4$ and $F^5$ of the locomotive are also rigidly journaled in the locomotive-frame, whereas the axles $V'$ $V^2$ $V^3$ are somewhat movable in the longitudinal direction. $V'$ is the locking-axle, swiveling around its central point, and $V^3$ is the front axle, which is usually also capable of swinging around a pivot situated toward the back end of the locomotive, as indicated at $f$ in Figs. 3 and 4. The length of the frame $a$ necessary for attaining the radial or overradial position of the axle $e$ can always be obtained by changing the length of that part of this frame fixed to the tender. The swinging of the swiveling axle is effected partly by the tendency of this axle to adopt a radial position, which tendency is supported by the frame $a$, the end of which is coupled to the tender and must follow the movement of this tender.

In case of the locomotive running forward, Figs. 3 and $3^a$, the tendency of the swiveling axle to adopt an overradial position is supported by the effect of the frame *a*, thereby effecting a movement of the locking-axle toward the outer rail. If the locomotive runs backward, Figs. 4 and 4ª, the effect of the frame *a* is to move the swiveling axle from the outer rail toward the inner rail, so that no side pressure is exerted upon the outer rail. The side pressures exerted from the following axles by the frame of the locomotive upon the swiveling axle, which side pressures are directed outward, are not strong enough to prevent the movement of the hollow axle toward the inner rail. If the frame *a* would not be arranged, the hollow axle *e* would, in case the locomotive moves backward also tend to adopt the radial position; but it would never perfectly attain this radial position, and it would in consequence thereof exert a side pressure upon the outer rail, which side pressure would still be augmented by the pressures derived from the following axles, which pressures have the same direction.

The object attained in locomotives by this new arrangement is that one coupled axle is provided which allows the passage of curves of small radius without the wheels of this coupled axle exerting a material side pressure upon the outer rail.

Having thus fully described the nature of our invention, what we desire to secure by Letters Patent of the United States is—

1. In a locomotive, the combination of a hollow axle having a crank-shaft passing through and universally jointed with the said axle, wheels rigidly attached to the axle, and a frame connecting this axle with a carriage or tender to be coupled to the locomotive, substantially as described and for the purpose set forth.

2. In a locomotive, the combination with a hollow axle, and a crank-shaft universally jointed together, the cranks of the latter being connected to the driving mechanism, of wheels coupled to the hollow axle, a frame connected to the hollow axle, so as to allow a swinging of this frame around the longitudinal axis of this axle, and means for universally joining the frame to the car or tender to be coupled to the locomotive, substantially as described and for the purpose set forth.

3. In a locomotive, the combination of a hollow axle having a crank-shaft passing through and universally jointed with the same, driving-wheels rigidly fastened to the ends of said axle, a frame fixed to this hollow axle so as to allow a swinging of this frame around the longitudinal axis of this axle, a frame universally jointed to the tender or car to be coupled to the locomotive, and means for rigidly connecting the second frame to the first one, substantially as described and for the purpose set forth.

In testimony whereof we have signed our names to this specification in the presence of two subscribing witnesses.

RICHARD KLIEN.
      ROBERT LINDNER.

Witnesses:
 PAUL ARRAS,
 ERNST C. MEYER.